Figure 1:
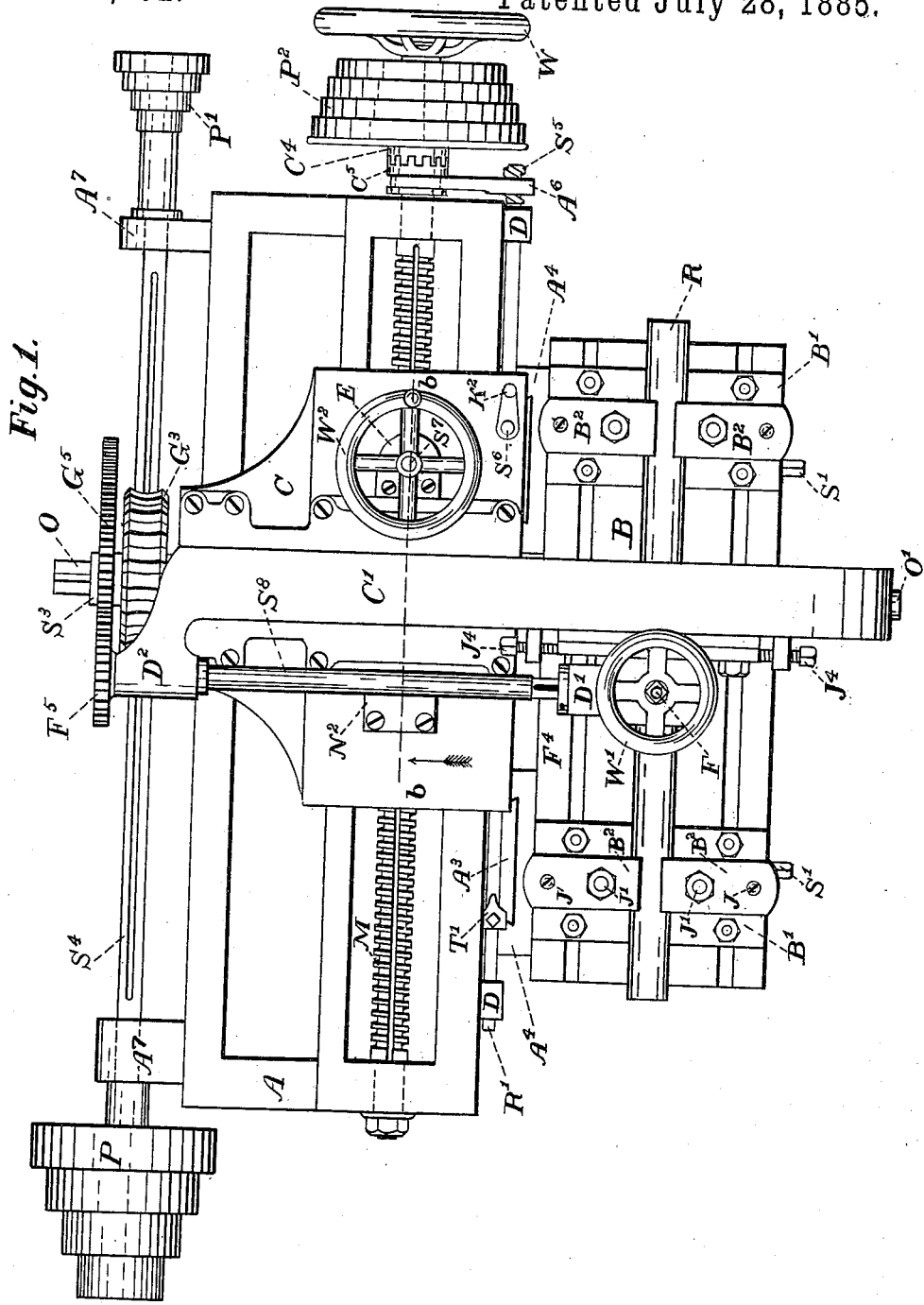

(No Model.)  6 Sheets—Sheet 1.

F. A. PRATT.
MILLING MACHINE.

No. 323,202.  Patented July 28, 1885.

Witnesses;
C. O. Palmer
H. W. Faulkner.

Inventor;
Francis A. Pratt,
By Francis H. Richards,
Attorney.

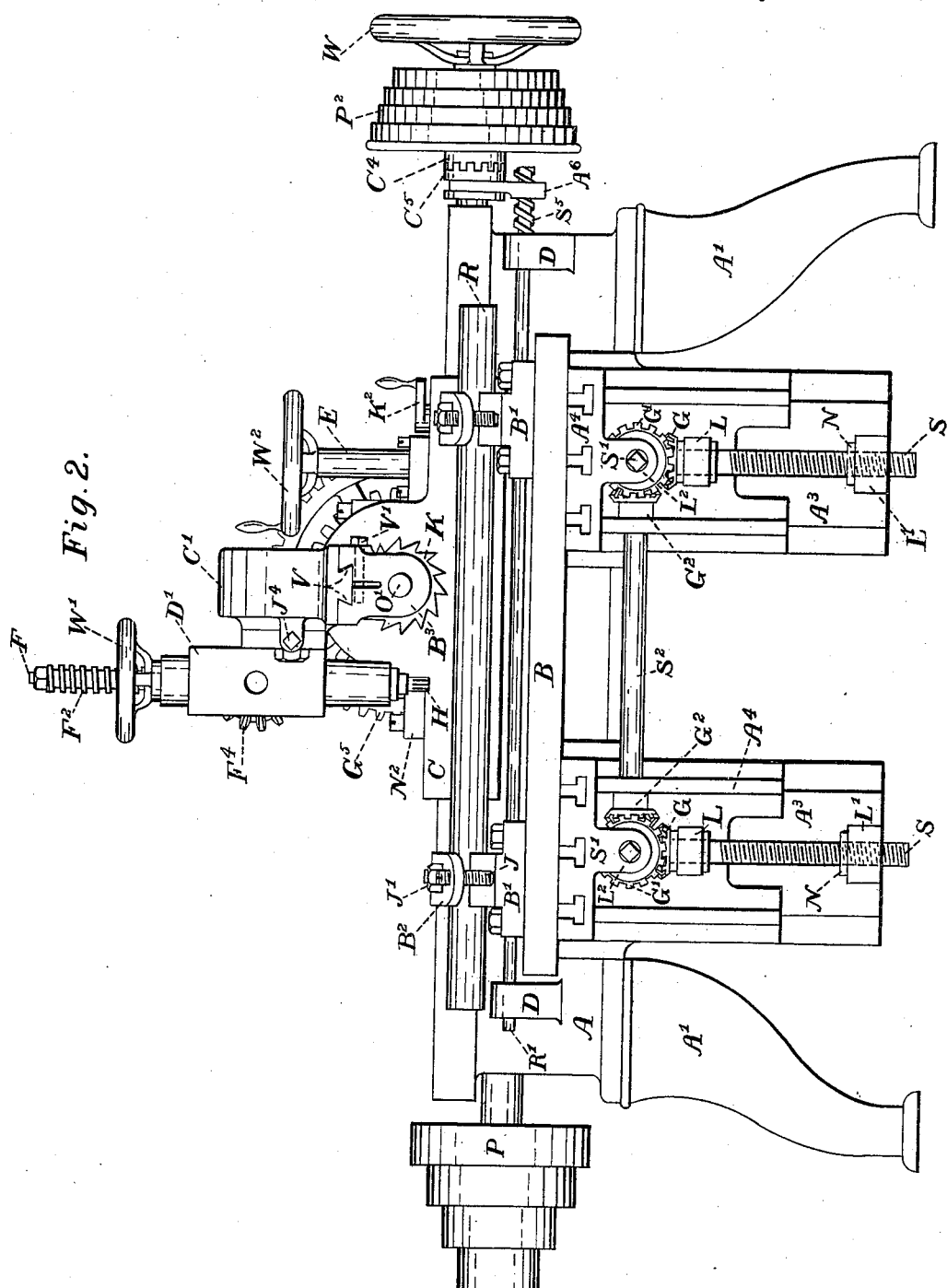

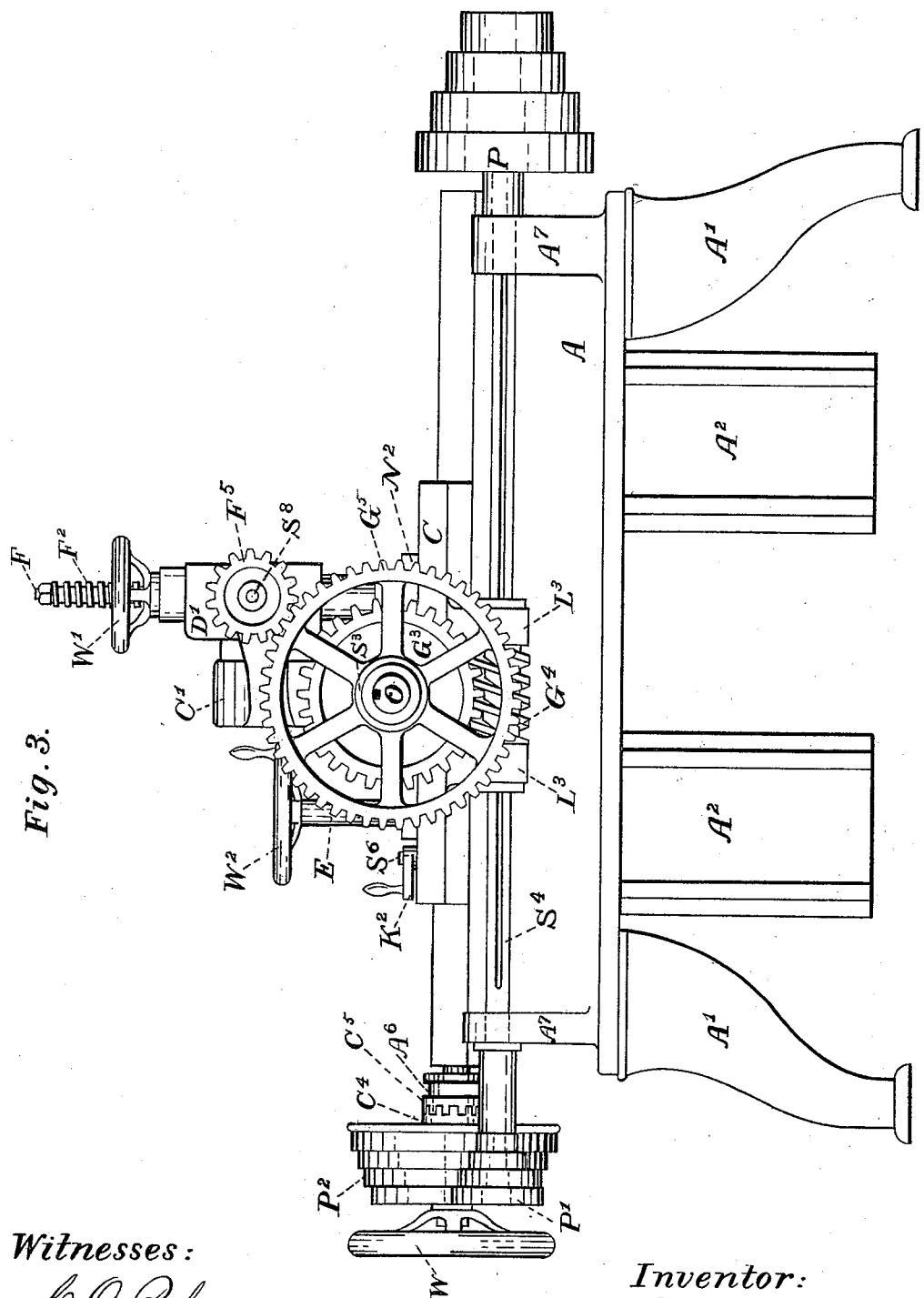

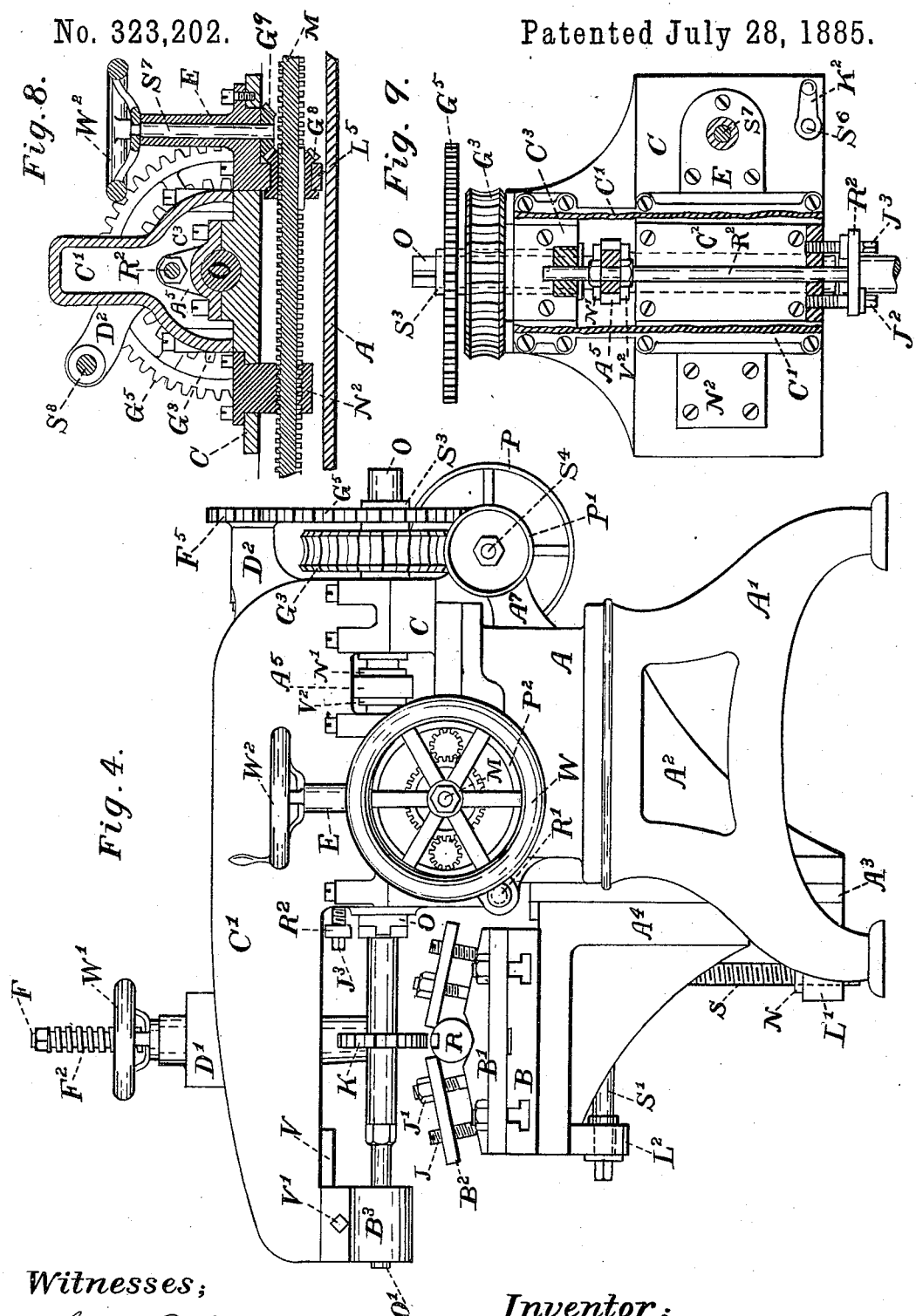

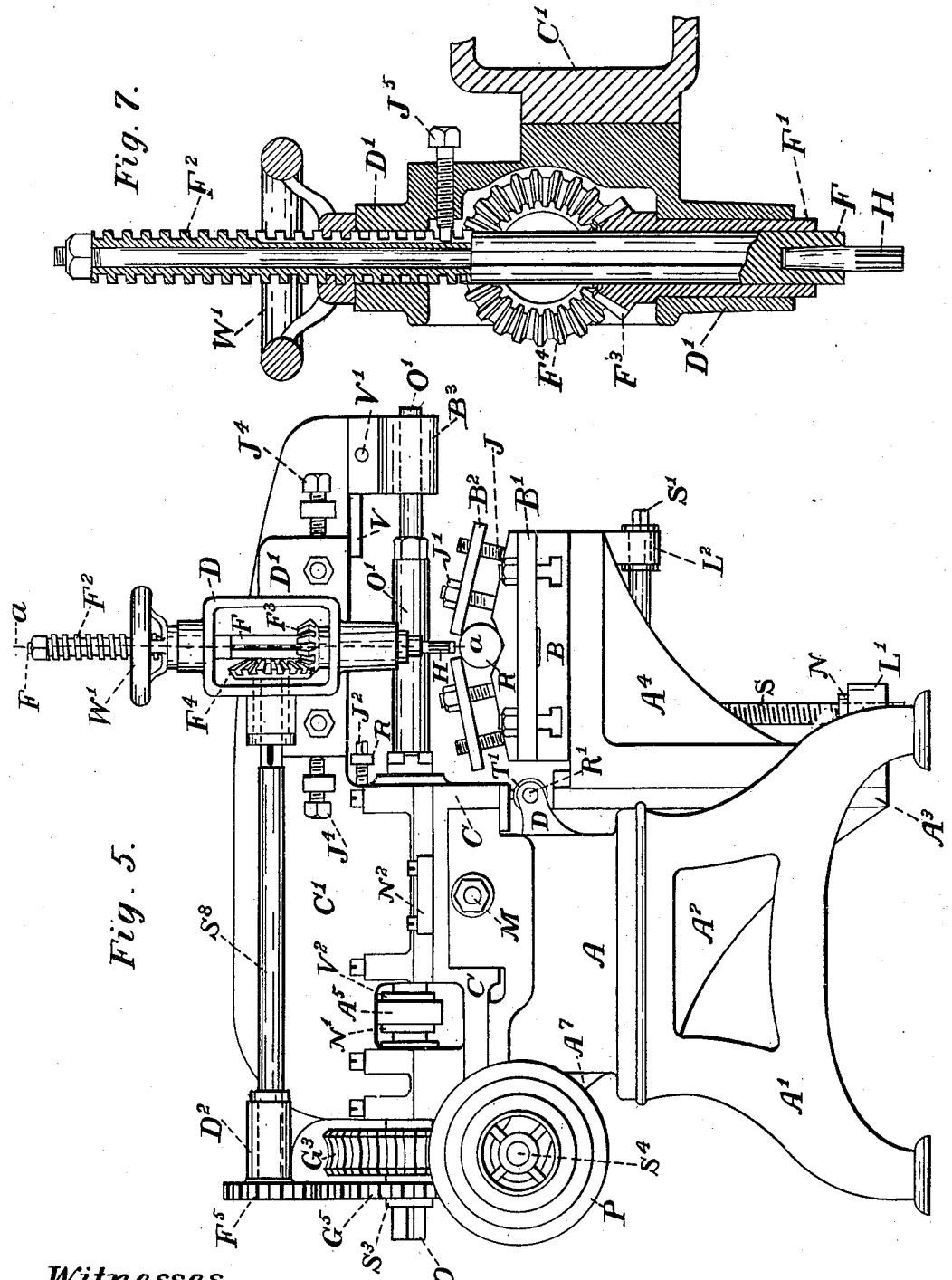

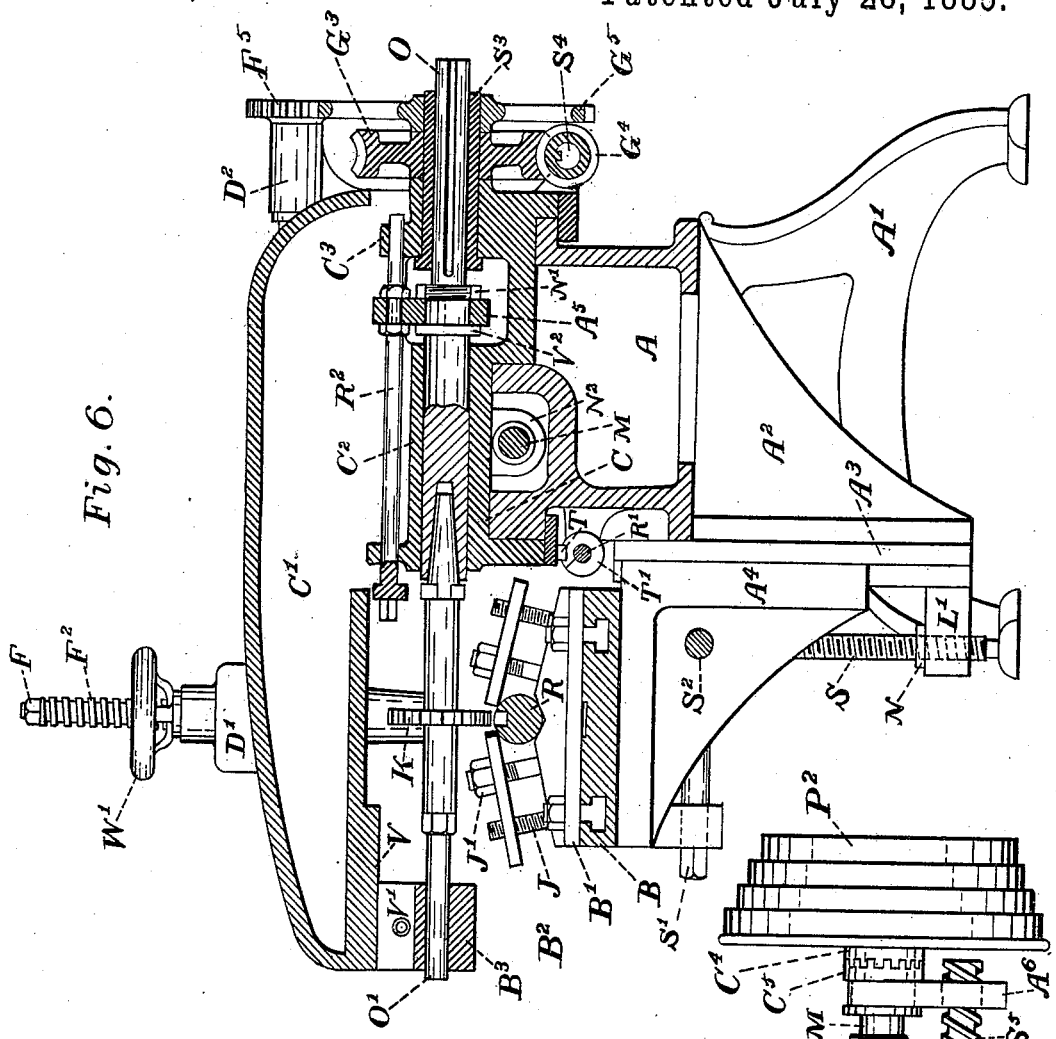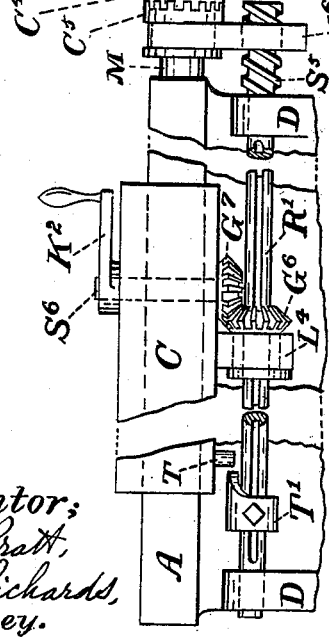

UNITED STATES PATENT OFFICE.

FRANCIS A. PRATT, OF HARTFORD, CONNECTICUT, ASSIGNOR TO THE PRATT & WHITNEY COMPANY, OF SAME PLACE.

MILLING-MACHINE.

SPECIFICATION forming part of Letters Patent No. 323,202, dated July 28, 1885.

Application filed May 1, 1884. (No model.)

*To all whom it may concern:*

Be it known that I, FRANCIS A. PRATT, a citizen of the United States, residing in the city and county of Hartford, State of Connecticut, have invented certain new and useful Improvements in Milling-Machines, of which the following is a specification, reference being had to the accompanying six sheets of drawings, forming a part thereof.

My invention relates to that class of machines for milling metals in which the articles to be operated upon are secured to an adjustable table, and the revolving cutter made to travel over them. It is especially adapted for milling slots or keyways in the shafts and other parts of machinery.

The invention will first be described in connection with the drawings, and then specifically pointed out in the claims.

In the drawings, Figure 1 is a plan view of a milling-machine embodying my invention. Fig. 2 is a front elevation, and Fig. 3 is a rear elevation, of the same. Fig. 4 is an elevation of the end at the right hand in Fig. 1. Fig. 5 is an elevation of the end at the left hand in Fig. 1. Fig. 6 is a vertical cross-sectional elevation of the machine near the center of its length, as shown in Fig. 1. Fig. 7 is a vertical section in line $a\,a$, Fig. 5. Fig. 8 is a front view showing a vertical section of the carriage at or near line $b\,b$, Fig. 1. Fig. 9 is a top view, partially in section, of the carriage and details, with a part of the latter removed. Fig. 10 is a contracted view of a part of Fig. 1, showing the device for starting and stopping the feeding motion.

Similar letters refer to similar parts throughout the several views.

In these views, A is the frame of the machine, having a form which is similar in general to the bed of the engine-lathe. It rests upon suitable supports, as legs $A'$, and is suitably constructed to carry the operative parts of the machine.

$A^2$ are two brackets, which are fixed to the under side of the frame A, and carry the two plates $A^3$, which plates have vertical ways whereon the knees $A^4$ are fitted to slide. These knees have each a lug, L, Fig. 2, for carrying the elevating-screws S, which screws are driven by means of gears G, fixed to their upper ends, and working in nuts N, fixed in lugs $L'$ of plates $A^3$. The knees $A^4$ have other lugs, $L^2$, for carrying the shafts $S'$, which shafts are constructed to receive a wrench whereby they may be rotated, and to carry the large gears $G'$, meshing with smaller gears G.

For the purpose of operating the two elevating-screws uniformly and simultaneously a shaft, $S^2$, is provided (see Figs. 2 and 6) having gears $G^2$, which are duplicates of gears G, Fig. 2, and mesh with gears $G'$. By this arrangement of gearing both knees may be operated from either of the two shafts $S'$ without the gear on one screw acting as an intermediate for the transmission of power to the other screw. If desired, more than two knees may be employed, each held, operated, and connected together as described.

For holding long shafts, as R, a fixture is provided which consists of the bed-plate B, rigidly secured to knees $A^4$, and a number of holding devices. These devices may be of any suitable construction. As herein shown, they consist of a block, $B'$, straps $B^2$, set-screws J, and holding-screws $J'$.

C is the carriage, which is fitted to slide on and is gibbed to suitable ways formed on the frame, and it has two bearings, which are covered by the front cap, $C^2$, and the back cap, $C^3$, for the main spindle O. This spindle is bored in the usual manner to receive a cutter-arbor, $O'$, for carrying the milling-cutter K; or said arbor may be made integral with the said spindle, if so preferred. These parts are shown best in Fig. 6. Upon the top of carriage C there is placed a strong and rigid carriage-arm, $C'$, which extends outward to the front of the machine and has ways V, whereon the bearing $B^3$, for supporting the outer end of spindle $O'$, is adjustably secured by means of clamp-screw $V'$. The spindle O is not supported directly by the back-bearing above referred to, but is splined and fitted to slide in and to revolve with a sleeve, $S^3$, which is fitted to turn in said bearing. This sleeve has secured thereto a worm-wheel, $G^3$, which is driven by the worm $G^4$, splined to and adapted to slide on the driving-shaft $S^4$, which shaft is carried in bearings $A^7$ and driven by pulley P. This worm is confined between lugs $L^3$ on the carriage C, which also assist in supporting the driving-shaft. A gear, $G^5$, is secured to said sleeve next to said worm-wheel, for purposes hereinafter described. The spindle O is arranged to have a longitudinal motion for the purpose of adjusting the cutter to the work. The device for effecting this consists of the arm $A^5$, loosely fitted to spindle O between collar $V^2$ and nut $N'$, Figs. 6 and 9, and the rod $R^2$, to which said arm is rigidly fixed, which rod is fitted to slide in lugs on the tops of caps $C^2$ and $C^3$, and is made T-shaped at its front end, (see Fig. 9,) where it is provided with a pulling-screw, $J^2$, and a pushing-screw, $J^3$, both entering holes in cap $C^2$. These screws act in opposite directions, and thus serve not only to move the rod R and thereby the spindle O in either direction, but also to hold them securely in any desired position.

M is a screw for traveling the carriage C upon the ways of frame A. It is supported in bearings formed in the ends of the frame, and works in a nut, $N^2$, secured to the carriage, substantially as shown, or in the usual manner. This screw has a hand-wheel, W, whereby it may be turned by hand, and is driven by power from a pulley, $P'$, on shaft $S^4$ by means of a band (not shown) which runs from said pulley onto the pulley $P^2$. This pulley $P^2$ is carried upon said screw, on which it is fitted to run freely outside of the frame, and has a clutch, $C^4$, whereby it may be engaged with and disengaged from said screw by means of a similar clutch, $C^5$, which is splined to that screw.

In order not to turn the screw M too rapidly, and not to require too great a difference in the sizes of the pulleys $P'$ and $P^2$, this pulley is usually connected to clutch $C^4$ by means of a sun-and-planet motion of the usual description, of which a part of the gears are shown in Fig. 4, within the rim of hand-wheel W.

The clutch $C^5$ is operated by means of a forked arm, $A^6$, which is threaded to fit the coarse screw $S^5$ of the shipper-rod $R'$. This rod is carried in bearings D on the front of the frame, and is operated by hand by means of gear $G^6$, which is splined to said rod and carried in lug $L^4$ of carriage C, (see Fig. 10,) gear $G^7$ meshing with gear $G^6$ and fixed to shaft $S^6$, shaft $S^6$ having its bearing in carriage C, and crank $K^2$ fixed to shaft $S^6$.

The rod $R'$ is operated by power for the purpose of stopping the machine by means of a pin, T, on carriage C, which acts against the spiral-faced stop $T'$, thereby revolving said rod sufficiently to withdraw clutch $C^5$ from clutch $C^4$.

E is a small stand or frame fixed on the carriage C, and adapted to carry devices—additional to hand-wheel W—for operating screw M by hand. It is bored to receive the vertical shaft $S^7$, and has a lug, $L^5$, for carrying a gear, $G^8$, which is splined to said screw M. (See Fig. 8.) The shaft $S^7$ carries at its lower end a gear, $G^9$, which meshes with gear $G^8$, and at its upper end the hand-wheel $W^2$, by which it is turned. When the frame A of the machine is of great length and the milling is to be done toward the left-hand end, this device is used for moving the carriage in preference to the hand-wheel W.

This machine is designed to mill slots in shafts or other parts by the use of two kinds of cutters, of which that hereinbefore referred to, K, is one and H the other, this latter being an "end mill," substantially as shown in Figs. 2, 5, and 7. This cutter is carried by a vertical spindle, F, which is splined to the sleeve $F'$, whereby it is rotated, and is fitted to revolve in the threaded thimble $F^2$, whereby it is moved longitudinally of its axis. This thimble is threaded externally and provided with a hand-wheel nut, $W'$, for elevating it, and it is splined upon one side to receive the point of a screw, $J^5$, Fig. 7, whereby it is prevented from turning. The sleeve $F'$ terminates at its upper end in a gear, $F^3$, which meshes with the gear $F^4$. The said sleeve $F'$, hub of gear $F^4$, and thimble $F^2$ are all carried in a frame, $D'$, which is adjustably secured to the carriage-arm $C'$ by means of screws shown in Fig. 5, the adjustment thereof—for the purpose of bringing the cutter H into proper relation to the work—being effected by sliding it on said arm by means of screws $J^4$. (Shown in Figs. 1 and 5.) This method of adjusting said frame $D'$ is not the only one which is suitable therefor, there being other well-known arrangements by means of which that result may be accomplished.

The spindle F is driven by means of the gears above described, and those gears by the shaft $S^3$, which is splined into the gear $F^4$ and carries a pinion, $F^5$, meshing with gear $G^5$, said shaft being supported by a bearing, $D^2$, formed on carriage-arm $C'$.

The operation of my improved milling-machine is as follows: The piece to be grooved—as, for instance, the shaft R to be splined—being properly fixed onto the blocks $B'$ or otherwise, as the case may be, and suitable cutters, as K and H, being properly secured and adjusted on the spindles O and F, respectively, power is then applied in the usual manner to pulley P, thereby revolving shaft $S^4$, and by means of the mechanism described communicating rotary motion to the said cutters and to clutch $C^4$. The carriage C is now moved by means of screw M and hand-wheel W or $W^2$ to the required position on the frame A, and the bed-plate is raised by means of the devices described therefor until the cutter K is in position to begin the cut, or has cut into the piece sufficiently deep, when the clutch $C^5$ is by the means described therefor engaged with clutch $C^4$, causing the carriage to travel on its ways and feed the said cutter to its work. When the carriage has traveled far enough, the pin T strikes the spiral face of stop $T'$, thereby revolving the rod $R'$, disengaging the clutches, and stopping the feeding motion.

If, now, the said spline or groove is not properly completed, or is of such a form that it cannot be so completed, it is finished by means of cutter H, which is to be made suitable therefor by lowering the piece R from the cutter, and then lowering the spindle F to bring the cutter H into proper position relative thereto, when it is fed to the work in similar manner as above described. By this means splines in shafts made by large circular cutters may be finished at the ends so as to have a uniform depth throughout their whole length, the "under cuts" made for finishing T-slots, and a great variety of other operations of a similar nature.

The particular construction of the frame A and carriage C, whereby this carriage is gibbed to said frame in a superior manner, I do not claim herein, having described and claimed the same in another application, Serial No. 154,475, filed January 30, 1885.

Having thus described my invention, I claim—

1. In a milling-machine, a sliding carriage, as C, having a rigidly-fixed arm, C', a laterally-adjustable frame, D', supported on said arm, horizontal spindle O, vertical spindle F, and gearing, substantially as described, between said spindles, combined and operating substantially as set forth.

2. In a milling-machine, in combination, carriage C, having arm C', sleeve $S^3$, gears $G^5$ and $F^5$, splined shaft $S^8$, gears $F^3$ and $F^4$, frame D', and spindle F, substantially as described.

3. In combination, spindle O, having collars or nuts $V^2$ and N', arm $A^5$, rod $R^2$, and screws $J^2$ and $J^3$, substantially as described.

4. In combination, frame A, carriage C, having nuts $N^2$ and parts to receive shaft $S^7$ and gear $G^8$, splined screw M, gear $G^8$, gear $G^9$, shaft $S^7$, and hand-wheel $W^2$, substantially as and for the purpose described.

5. In combination, a frame, as A, a carriage, as C, having a pin, T, an oscillating shaft, R', carrying an adjustable spiral-faced stop, T', and having a screw-thread, $S^5$, arm $A^6$, screw M, and clutches $C^5$ and $C^4$, substantially as described.

6. In combination, a frame, as A, a carriage, as C, having a lug, $L^4$, and a bearing for shaft $S^6$, splined shaft R', having screw-thread $S^5$, gears $G^6$ and $G^7$, shaft $S^6$, having a handle, as $K^2$, arm $A^6$, screw M, and clutches $C^5$ and $C^4$, substantially as described.

7. The combination and arrangement herein shown and described of the frame A, having ways for the two sliding knees, $A^4$, and supports for nuts N, screws S, shafts S', connecting-shaft $S^2$, large gears G' on shaft S', and smaller gears G and $G^2$ on said screws and shafts $S^2$, respectively, whereby both of said knees may be elevated simultaneously by the turning of either of said shafts S', without the gear on one screw acting as an intermediate for the transmission of power to the other screw.

FRANCIS A. PRATT.

Witnesses:
GEO. A. REYNOLDS,
F. H. RICHARDS.